United States Patent

[11] 3,577,813

[72] Inventor Evgeny Nikolavevich Vorontsov
Blagodatnaya ulitsa, 25, kv. 45, Leningrad, U.S.S.R.
[21] Appl. No. 814,573
[22] Filed Apr. 9, 1969
[45] Patented May 4, 1971

[54] DEVICE FOR STRIPPING OUT SHIELDING SHEATH
1 Claim, 2 Drawing Figs.
[52] U.S. Cl. .................................................. 81/9.51, 83/924
[51] Int. Cl. ........................................................ H02g 1/12
[50] Field of Search ............................................. 81/9.51, 9.5 (M); 83/(Inquired) 924; 29/(Inquired)

[56] References Cited
UNITED STATES PATENTS
| | | | |
|---|---|---|---|
| 1,930,219 | 10/1933 | Zimber.......................... | 81/9.51X |
| 2,366,271 | 1/1945 | Lerch............................ | 81/9.51X |

FOREIGN PATENTS
| | | | |
|---|---|---|---|
| 630,212 | 5/1936 | Germany....................... | 81/9.51 |

Primary Examiner—Lester M. Swingle
Assistant Examiner—Rosco V. Parker, Jr.
Attorney—Holman, Glascock, Downing & Seebold ABSTRACT: A device for stripping shielding sheath or insulation from the ends of wires or cables, in which two diametrically opposite cutting members each of which constitutes a milling cutter adapted to rotate in the direction of the wire feed coact with a blade fixed in position with respect to the cutter to provide shears to sever the shielding sheath or insulation.

Patented May 4, 1971  3,577,813

INVENTOR
E. N. VORONTSOV

By Holman, Glascock, Downing
& Seebold

ATTORNEYS

3,577,813

DEVICE FOR STRIPPING OUT SHIELDING SHEATH

BACKGROUND OF THE INVENTION

The present invention relates generally to the field of mechanization of electrical and radio erection works and more particularly to devices for stripping a shielding sheath or insulation from the ends of wires or cables.

The invention can be used in radio-electrical and electronic industries, the industry of communication facilities and radio-electrical erection or repair works.

Devices are known in the art for stripping a shielding sheath from the wire ends, which comprise a cutting head defined by an annular die having a cutting lip along the circumference of a die hole, and a tubular attachment terminating in a cone and serving as a punch to cut a shielding sheath in the form of a cable or wire braiding.

Such a device requires a preliminary manual preparation of the wire end to provide a circular gap located between the wire insulation and the shielding sheath for receiving the punch. However, in wires with an increased filling density of the shielding braid, it is impossible to obtain a circular gap. Moreover, each size and type of wire involves the use of its own set of tools that is, a female die and a punch.

It is an object of the present invention to eliminate the above mentioned disadvantages.

SUMMARY OF THE INVENTION

It is the main object of the present invention to provide a device for stripping a shielding sheath or insulation from a wire or cable ends which is capable of skinning the wires or cables of any cross-sectional area braided with a shielding sheath of any density without any preliminary preparation of the wire or cable involved.

The above object is accomplished due to the fact that the present device comprises a cutting head incorporating two diametrically opposed cutting members between which the wire to be skinned is passed, each of the cutting members being essentially a milling cutter rotating in the direction of the wire feed, and a blade mounted immovably with respect to the milling cutter for providing shears to sever the shielding sheath or insulation with both of the cutting members rotating around the wire or cable being processed.

Further important objects and advantages of the invention will become more fully apparent to persons skilled in the art from the following detailed description of an exemplary embodiment of the present invention and the accompanying drawings, wherein:

BRIEF DESCRIPTION OF THE DRAWINGS

Referring to FIG. 1, the device for stripping a shielding sheath comprises a cutting head incorporating two diametrically opposed cutting members 1 and 2. Each of the members is defined by a rotatable milling cutter 3 and a blade 4 fixed in position with respect to the milling cutter. Each of the cutters 3 is adapted to rotate in the direction of the feed of a wire 5 being processed which is fed between the cutting members 1 and 2 in the direction indicated by the arrow A. Each pair of cutters and blades constitute a shears to sever the shielding sheath of the wire. A clearance is specified between each pair of cutters and blades with, the size of the clearance being controlled by a tapered bushing 6.

Figures 1, 2:
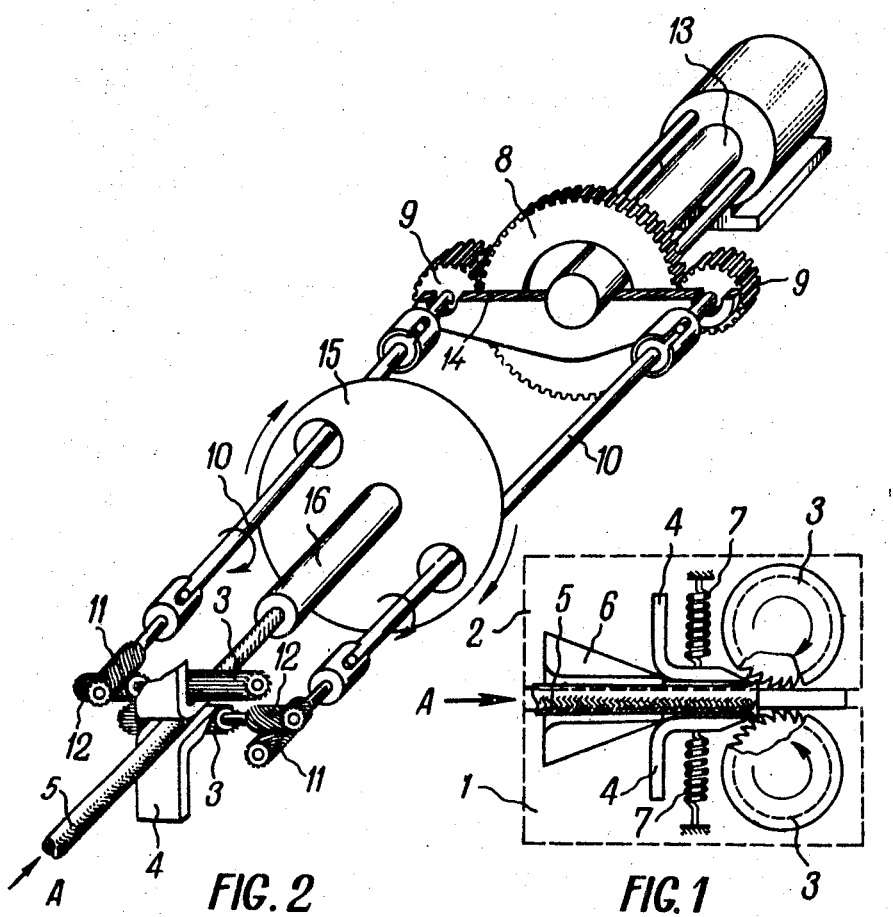
FIG. 1 is a partly in section and partly in elevation view of the cutting members of a cutting head of a device according to the invention.
FIG. 2 is a diagrammatic view in perspective of the device according to the invention.

The provision of such a controllable clearance makes it possible to process wires of various cross-sectional areas and to strip shielding sheaths of different densities.

Each blade 4 is pressed against the wire 5 by a spring 7.

The milling cutters 3 are rotated from a stationary gear wheel 8 (FIG. 2) through pinions 9 rigidly mounted on shafts 10 and via gear means 11 and 12 with the gear means 11 being fast on the shaft 10. Each means of the cutting members 1 and 2 is placed in rotation around the wire 5 from a drive shaft 13 with which the pinions 9 are connected through a crosspiece 14.

To control the wire length to be stripped there is provided a check plate 15 having a stop block 16.

The device operates as follows:

Once the tapered bushing 6 has been adjusted to accommodate the diameter of the wire 5 to be processed and the stop block 16 set for a required length to be stripped from the shielding sheath, the drive (not shown) is engaged, and the wire 5 introduced into the bore in the bushing 6. Then, the drive shaft 13 causes the crosspiece 14 together with the pinions 9 to turn so that the pinions ride over the stationary gear wheel 8 thus imparting rotation to the shafts 10. Further the gear means 11 on the shafts 10 start to rotate and by meshing with the gears 12 impart rotation to the cutters 3 in the direction of the feed of the wire 5. While rotating, the cutters 3 tear and strip the shielding sheath which, while entering between the cutter teeth and the fixed blades 4, is severed. Due to the rotation of the cutting members 1 and 2 around the wire 5, the severing of the shielding sheath occurs throughout the circumference of the wire being processed.

I claim:

1. A device for stripping a shielding sheath or insulation from the ends of wires or cables, comprising two diametrically opposed cutting members between which the wire or cable to be stripped is free to pass, each of said cutting members being defined by a milling cutter adapted to rotate in the direction of the wire or cable feed, and a blade immovably mounted with respect to each of said cutters to form therewith a shears to sever the shielding sheath or insulation, said cutter and said blade of each of the cutting members being adapted to rotate around the wire or cable being processed, and means to impart rotation to both said cutter and said blade.